United States Patent [19]

Kawata et al.

[11] Patent Number: 5,012,792
[45] Date of Patent: May 7, 1991

[54] ROTARY BLADE AND A ROTARY SUBSTRATE FOR USE IN THE ROTARY BLADE

[75] Inventors: Azuma Kawata, Kasaoka; Shuichiro Koroku; Hirofumi Kano, both of Sakai; Ichiro Miyao, Sakai, all of Japan

[73] Assignee: Osaka Diamond Industrial Co., Ltd., Osaka, Japan

[21] Appl. No.: 457,954

[22] Filed: Dec. 27, 1989

[30] Foreign Application Priority Data

Dec. 27, 1988 [JP] Japan .......................... 63-169720[U]
Dec. 28, 1988 [JP] Japan ................................ 63-335561

[51] Int. Cl.⁵ ............................................. B24D 5/06
[52] U.S. Cl. ................................. 125/15; 51/206.4; 76/112
[58] Field of Search ............... 51/206 R, 206 P, 206.5, 51/206.4; 125/15; 407/56, 52, 51, 40; 76/112

[56] References Cited

U.S. PATENT DOCUMENTS

| | | | |
|---|---|---|---|
| 2,563,559 | 8/1951 | Sneva | 76/112 |
| 2,990,828 | 7/1961 | Hoever | 125/15 |
| 3,363,617 | 1/1968 | Hoerer | 125/15 |
| 3,513,821 | 5/1970 | Bouvier | 125/15 |
| 4,484,560 | 11/1984 | Tanigawa | 125/15 |
| 4,794,835 | 1/1989 | Fujiyoshi | 76/112 |

FOREIGN PATENT DOCUMENTS

| | | | |
|---|---|---|---|
| 2248685 | 5/1975 | France | 51/206.5 |
| 50-10040 | 4/1975 | Japan . | |
| 0167770 | 8/1985 | Japan | 125/15 |
| 0872281 | 10/1981 | U.S.S.R. | 125/15 |

*Primary Examiner*—Robert A. Rose
*Attorney, Agent, or Firm*—Wenderoth, Lind & Ponack

[57] ABSTRACT

A rotary blade has a rotary substrate with chips disposed about the outer edge of the substrate. The substrate further has two sets of semicircular slits. The first set of semicircular slits is disposed annularly about the rotary substrate on a circle coaxial with the center of rotation of the rotary blade. The semicircular slits open toward the center of rotation. The second set of semicircular slits are disposed on a circle inside of the circle of first slits. These slits open outwardly, thus blocking, at least partially, the first semicircular slits from the center of rotation. A filler material is filled into the semicircular slits, the slits thus providing a vibration damping effect. The chips may be attached to the outer edge of the rotary substrate by concave profiled cassette stands.

10 Claims, 3 Drawing Sheets

ROTARY BLADE AND A ROTARY SUBSTRATE FOR USE IN THE ROTARY BLADE

BACKGROUND OF THE INVENTION

1. Field of the Invention

The present invention relates to a rotary blade capable of a damping of noises generated during rotation, and further relates to a construction of the rotary blade useful for cutting a stone, concrete, asphalt and the like.

2. Prior Art

A rotary blade capable of damping noises has been disclosed in Japanese Patent Publication No. Sho 50-10040. In this rotary blade, a plurality of grooves having a suitable width, for example 1.5 m, and a suitable length, for example about 10% of an outside diameter of a saw member, are formed at regular intervals from the vicinity of a base portion toward almost a center of the blade on a circumferential edge of the rotary substrate. The respective grooves are filled with setting synthetic resins having a hardness lower than that of the rotary substrate to fixedly mount the setting synthetic resins on the grooves.

It has been described that, according to this construction, low sound waves generated from the setting synthetic resin layer interfere with sound waves generated from the blade to hinder the tuning and resonance of sound waves, thereby changing simple high sounds to complicated low sounds, and thus high and sharp metal sounds are deadened, as a whole.

The blade formed on the circumferential portion of the rotary substrate is rotated at a high speed to produce a turbulent air flow, thereby generating sounds. The blade thus receives an external force resulting from the generation of this turbulent flow to be vibrated, or receives an external force resulting from a load on a material to be cut to be compulsorily vibrated, and thus this vibration is resonant with vibration of the rotary substrate to generate large sounds. According to the Japanese Patent Publication No. Sho 50-10040, a plurality of grooves are formed from the vicinity of the base portion toward almost the center of the blade portion and filled with setting synthetic resins having a hardness lower than that of the blade to act as a buffer zone for the propagation of vibration, thereby partially stopping the propagation of vibration in the rotary substrate, and thus reducing also the resonance.

However, according to the Japaneses Patent Publication No. Sho 50-10040, the buffer zone of vibration is arranged in a radial direction from the center, so that the vibration resulting from the blade portion is damped in the circumferential direction on the rotary substrate, but the vibration generated in the blade portion is reflected in the central portion, whereby the generated vibration can not be sufficiently damped.

OBJECTS AND SUMMARY OF THE INVENTION

In view of the above described problems, it is an object of the present invention to damp the vibration resulting from the blade (saw toothed-portion) in the circumferential portion of the rotary substrate causing the increased vibration in not only the circumferential direction on the rotary substrate but also the direction toward the center from the circumferential portion of the rotary substrate.

In order to achieve the above object, in a rotary blade in which a number of chips formed with super grinding diamond particles integrally by a metallic bond material are placed at an internal on an outer edge of the rotary substrate a plurality of first semicircular slits open toward a center of rotation of the substrate are formed at regular intervals with a first circumference positioned in the vicinity of an outer edge of the rotary substrate. A plurality of second semicircular slits open in a direction opposite to the direction, in which the first slits open partially interrupting the direction, in which the first slits open. The second slits are formed at a second circumferential position inside the first slits. All of the slits are filled with fillers to integrate the slits with the rotary substrate.

In addition, according to the present invention, a large number of grooves are formed in the outer circumference of the substrate and similarly filled with fillers.

BRIEF DESCRIPTION OF THE DRAWINGS

The present invention will be described below in more detail with reference to a preferred embodiment shown in the accompanying drawings, wherein.

DESCRIPTION OF THE PREFERRED EMBODIMENT

Figure 1:
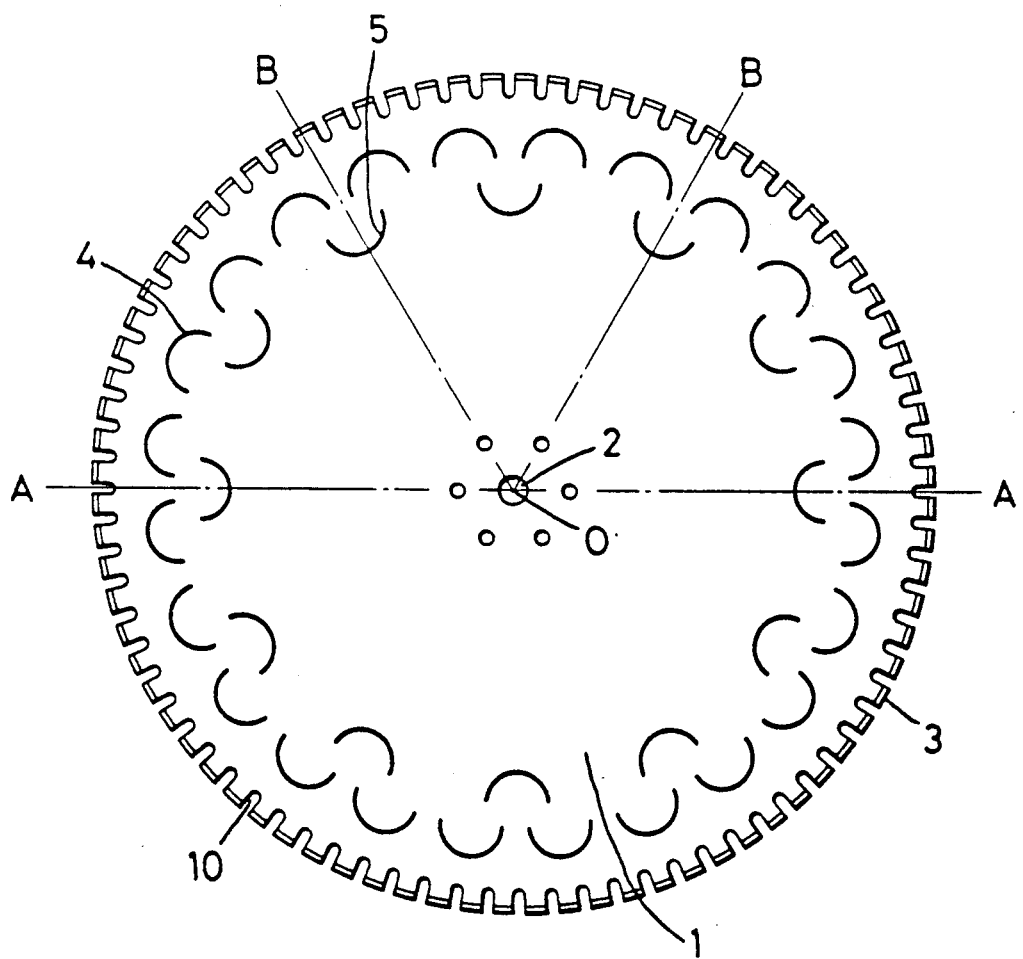
FIG. 1 is a plan view showing a preferred embodiment of a rotary substrate for use in a blade according to the present invention.

FIG. 1 shows the whole of a rotary substrate for use in a rotary blade according to the present invention.

Reference numeral 1 designates the rotary substrate, formed of a punched steel plate or stainless steel plate in a circular shape. Reference numeral 2 designates an axial hole formed at a center of the rotary substrate 1, reference numeral 3 designates a blade, and reference numerals 4 and 5 designate first and second semicircular slits, respectively.

Figure 2A:
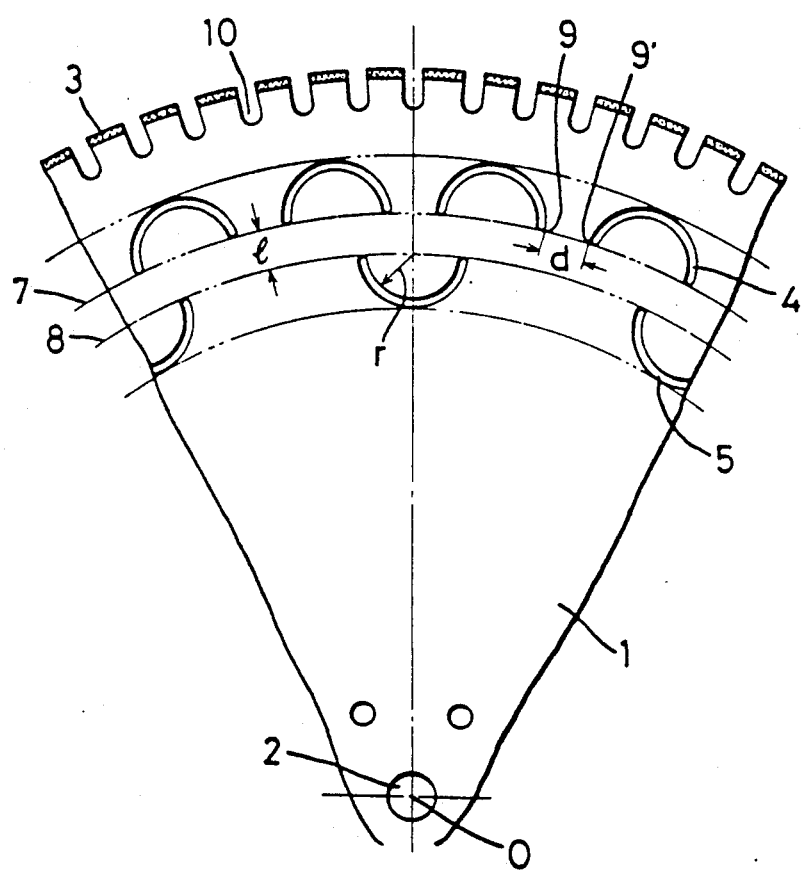
FIG. 2(a) is an enlarged view showing portion B—B in FIG. 1.
Figure 2B:
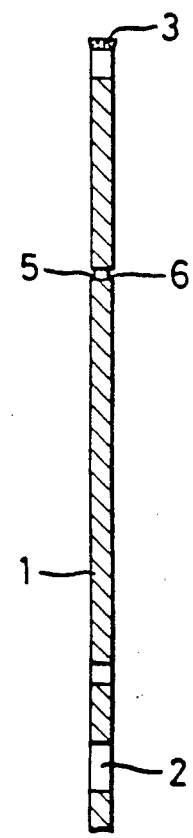
FIG. 2(b) is an enlarged partial sectional view of FIG. 1 taken along line A—A thereof.

FIG. 2(a) is an enlarged view showing a portion surrounded by lines B—B in FIG. 1 and FIG. 2(b) is an enlarged sectional view of FIG. 1, taken along line A—A thereof. Referring to FIG. 2(b) reference numeral 6 designates fillers.

As shown in FIG. 1, the present preferred embodiment 24 first slits 4 and 12 second slits 5 are formed. The thickness of the substrate is, for example, 4 to 9.5 mm, and the diameter is, for example, 30 to 100 inches (75 to 254 cm).

A first circumference 7 is established in the vicinity of an outer edge of the rotary substrate 1, with the center of the rotary substrate 1 as 0 the 24 semicircular slits 4 are formed all about the outside circumference of the first circumference 7. An interval d between ends 9 and 9' of adjacent slits 4 is set so as to be smaller than 2 times an inside radius r of the formed semicircular slits 4.

The respective semicircular slits 4 have a shape opening in a direction toward the center 0 of the rotary substrate 1, and may have a circular arc slightly larger or smaller than a semicircle.

These semicircular slits 4 are formed by means of a laser processing machine so as to be made round at both end portions thereof. A slit width of about 0.4 mm is suitable.

The slits, which have been formed in the above described manner, are referred to as the first semicircular slits.

Subsequently, a second circumference 8 is established inside of the first circumference 7, with the center 0 as a fundamental point, and 12 semicircular slits 5, which open in a direction opposite to the direction in which the adjacent slits 4 open (slits 5 opening outward). The slits 5 simultaneously cross over both end portions 9 and 9' to partially interrupt the direction in which the adjacent slits 4 to open, and are formed for every two adjacent slits 4 inside of the circumference 8. The circumference 8, the radii connecting both end portions 9 and 9' of the first adjacent semicircular slits 4 and the center 0 of the substrate are standards.

The processing and the width of the slits 5 are same as those of the slits 4.

In the above described case, a difference 1 between the first circumference 7 and the circumference 8 in diameter is dependent upon the mechanical strength of the rotary substrate 1 when subjected to a cutting load.

The shape and arrangement of the slits lead to the possibility that the whole length of the slits themselves can be increased without decreasing the rigidity of the substrate (the rigidity of the substrate for holding the blade within an appointed plane during a high-speed rotary grinding) operation, thereby increasing the quantity of fillers and improving the sound damping effect.

In addition, the semicircular slits 4 and 5 may be the same or slightly different in diameter.

All of the semicircular slits 4 and 5 are filled with fillers obtained by compounding heat resistant, pressure resistant and shake-proof sealing agents to synthetic resins. The most suitable synthetic resins for filling have, hardness which can be regulated, ranging from a rigid state to a flexible state, and are water-proof to such an extent that they are difficult to dissolve in cutting water. Further, a strong adhesion to metals, to such an extent that they do not fall out by centrifugal force due to the high rotation frequency, and a low viscosity required for easy filling, are most suitable. The sealing agents used contain, for example, asbestos and glass fibers. The fillers are adapted to have a hardness lower than that of the rotary substrate after setting.

Referring to FIG. 1 and FIGS. 2(a), (b) and the blade 3 is formed by fixedly brazing and welding chips, which have been obtained by sintering diamond particles integrally with metals, to stand portions formed by U-shaped grooves 10 on an outer edge of the substrate 1 at regular intervals or by a cassette construction.

The cassette construction of the blade is here described in detail. A cutting chip has been directly fixed to the substrate in many cases, but as disclosed in Japanese Utility Model Laid-Open No. Sho 62-198058, a chip which is detachable by means of a fixture, the chip having a dovetail groove type cassette construction, has been known.

Figure 6:
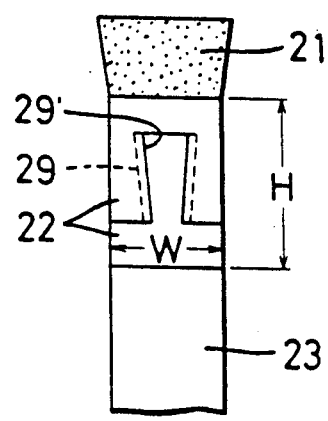
FIG. 6 is a side view showing a conventional cassette structure.

Of the conventional chips, the chip having an easily detachable dovetail groove type cassette construction as shown in FIG. 6 is most easily used. However, with this construction, disadvantages have occurred in that a female die of a cassette stand 22 is apt to be unstable in strength under severe operating conditions, and both sides 29 and 29' of a male die and the female die are subjected to a taper machining, so that the accuracy is apt to fluctuate and the engagement position is apt to be not fixed. In addition, with respect to the construction, a blade having a cassette construction cannot be produced by casting, but must be produced by machining, so that the cost is increased.

The cassette construction of the blade, which is part of the present invention, has solved the problems described in the preceding page by changing the conventional dovetail groove type cassette, that is, an up and down engagement, to a side surface engagement, by means of a stand having a concave section along a direction perpendicular to the direction of blade rotation.

TEST EXAMPLE 1

Rotary substrates having diameters of 40, 60, 72, 80 and 100 inches (about 100 to 254 cm) and thicknesses of 5.0 to 7.0 and 6.59 to 9.0 mm, the substrates having 24 first semicircular slits and 12 second semicircular slits having a width of 0.2 mm formed thereon the slits are filled with fillers comprising low-viscosity flexibility-adjustable epoxy molding resins as a main ingredient of 40 or more % by weight, a hardener of 55 or less % by weight and a heat resistant, pressure resistant and shake-proof sealing agent of 10 to 15% by weight, which are subsequently set, were produced and tested with regard to sound damping effect. The results are shown in Table 1.

In addition, a measuring distance was set at 1 m in a low-noise room and the A scale of NA-09 manufactured by Rione, Ltd. was used for the measurement.

TABLE 1

| Size (inch) | Usual subst. | Slitted subst. | Resin-filled subst. | Rotation frequency r.p.m. |
| --- | --- | --- | --- | --- |
| 40 | 101 dB | 101 dB | 92 dB | 550 |
| 60 | 101 dB | 102 dB | 91 dB | 350 |
| 72 | 102 dB | 102 dB | 91 dB | 300 |
| 80 | 102 dB | 102 dB | 91 dB | 300 |
| 100 | 103 dB | 104 dB | 92 dB | 230 |

On the other hand, a rotary substrate having a size of 40 inches (about 100 cm), which is shown in Table 1, with four grooves of 1.5 mm width and 4 inches (about 10 cm) long, shown in the publication, formed from the vicinity of the base portion of the saw-toothed portion toward the center, and then filled with synthetic resin fillers having the same composition as the fillers, was produced and tested with regard to sound damping effect under the same conditions, with the result of 94 dB.

Next, the rotary blade according to the present invention using the slitted substrate is described with reference to FIGS. 3 (a) and (b).

Figure 3A:
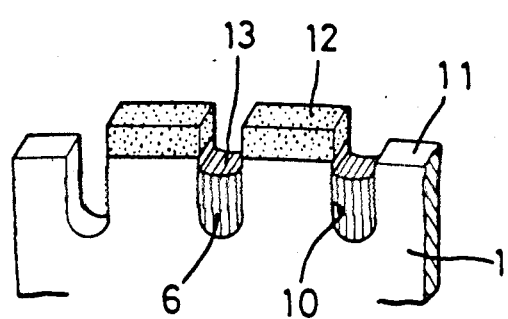
FIGS. 3(a), and (b) are diagrams showing a preferred embodiment of a rotary blade according to the present invention.
Figure 3B:
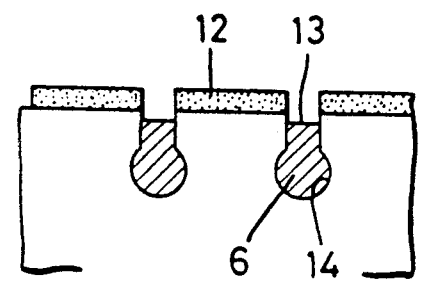

FIG. 3 (a) shows a portion corresponding to the circumferential blade of the substrate shown in FIG. 1. Reference numeral 10 designates U letter-shaped grooves formed on the outer edge of the substrate 1 at regular intervals, which let ground powders go and serve as radiating portions. Chips 12, obtained by sintering diamond powders integrally with metals or by sintering tungsten carbide, are fixedly brazed and welded to whole stands 11 formed of the U letter-shaped grooves 10 to form the blade, or the blade is formed by the cassette construction.

According to the present invention, subsequently, the U letter-shaped grooves 10 are filled with fillers 6 having the same composition as the fillers used and described above. However, their composition may not always be the same as that of these fillers. The upper surface 13 of the fillers 6 is adapted to be within the groove and leave the groove room for depth between the preceding chip 12 and the subsequent chip 12.

FIG. 3 (b) shows a rotary blade provided with a key groove 14 in place of the U letter-shaped groove in the preferred embodiment shown in FIG. 3(a). As to the fillers 6, both are the same. Thus rotary blade is formed.

TEST EXAMPLE 2

24 first semicircular slits and 12 second semicircular slits were formed on a rotary substrate having a diameter of 40 inches and a thickness of 5.0 mm according to the TEST EXAMPLE, the respective slits being filled with fillers, chips being fixedly mounted on the whole stand portion on the circumference on the rotary substrate, and U letter-shaped grooves being filled with the fillers to produce a rotary blade. The resulting rotary blade was rotated at 550 r.p.m. without applying a grinding load with the result that the noise amounted to 92 dB as measured by the same method as in TEST EAXMPLE 1 for both the rotary substrate and the rotary blade.

The latter was ground with loading with the result that the noise amounted to 100 dB as measured in the same manner. It was found from this that the noise was reduced by about 10 dB or more in comparison with that of the conventional rotary substrate having the same shape and subjected to no sound damping measures.

TEST EXAMPLE 3

Figure 4:
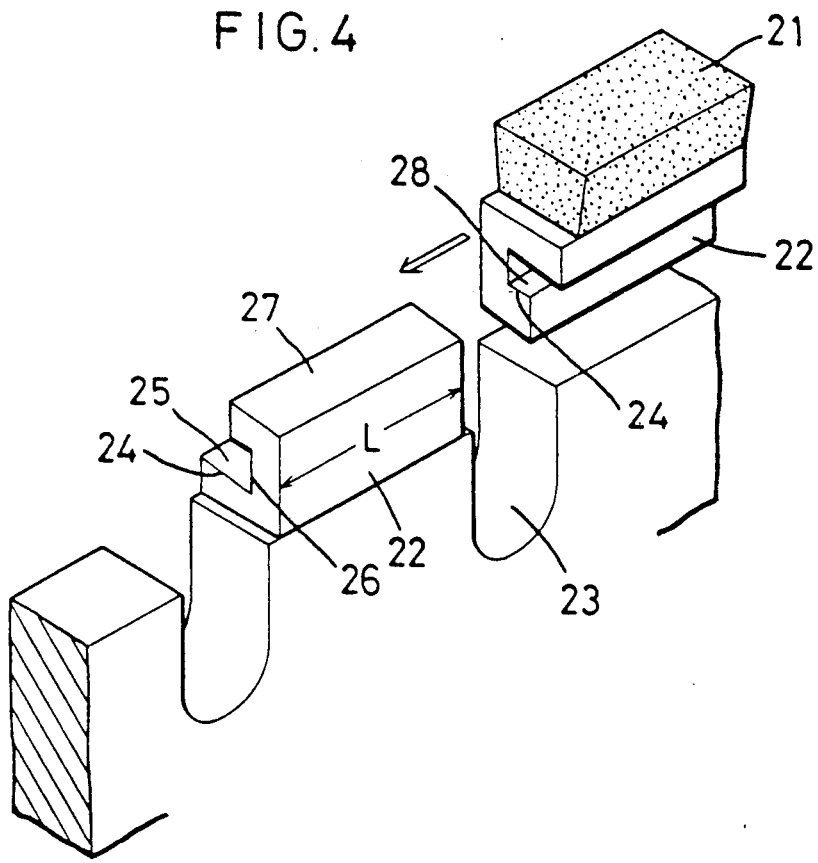
FIG. 4 is a perspective view describing a cassette structure of the blade.
Figure 5:
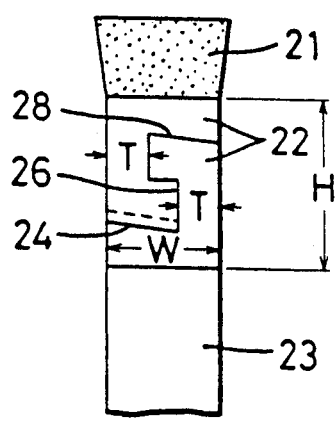
FIG. 5 is a side view of FIG. 4.

Referring to FIGS. 4 and 5, reference numeral 23 designates an outside portion of a substrate of a blade made of an iron plate and the like. A cassette stand 22 having a concave section is fixedly mounted on an end face of said outside portion 23 of the substrate by welding and the like. Reference numeral 21 designates cutting chips obtained by bonding super grinding material particles, such as diamond particles, with metals. A cassette stand 22 having a concave section is fixedly mounted on an inside end face of the cutting chips 21. Both cassette stands 22 are engaged in such a manner that the lower protrusion of the cassette stand 22, with the cutting chip 21 being fixed on the upper surface thereof, and which forms a concave section of the cassette stand 22, is attached to the concave portion the cassette stand 22 on the substrate 23. Either the upper or lower side forming the concave portion of each cassette stand 22 is made longer than the other, and the outside of the longer sides are fixed to the substrate and the chip, respectively.

An acute-angled taper 24 is formed in a sectional direction and a tapered surface 25 inclined in an opposite direction in correspondence to the acute-angled taper 24 is formed in a longitudinal direction on an inside of the longer side.

The shorter side 27 is engagedly put in the concave portion 26 of the other cassette stand, so that a plane 28 corresponding to the taper 24 and the tapered surface 25 meeting at right angles with the sectional direction is formed. A plurality of cassette stands 22 are fixedly mounted on the outside of the substrate 23 at intervals, as shown in FIGS. 4 and 5, but the tapered direction of the tapered surface 25 is the same.

The respective cassette stands 22 are fixedly mounted with a large number of cutting chips 21 are taperedly engaged with the substrate 23 in a direction shown by an arrow in FIG. 4 to be bonded integrally with the substrate 23.

It goes without saying that a direction of rotation or direction of advance of the substrate during the cutting is opposite to the direction shown by the arrow and the bonding strength is high. The cassette stand having the above described construction can be easily produced by shaving soft steel materials and the like, the powder metallurgy and the casting.

In addition, although the taper 24 in the sectional direction is formed on two concave sides and the tapered surface 25 in the direction meeting at right angles with the sectional direction is formed on merely one side, the contrary arrangement may be adopted and also the tapered surface 25 may be formed on two sides.

The comparison test results of the strength of the stands according to the preferred embodiments according to the present invention shown in FIGS. 4 and 5 and the conventional stand shown in FIG. 6 are shown in Table 2.

In the test of the rotary blade having a diameter of 80 inches, the stand was made of stainless steel (SUS 304) and W was set at 8 mm, H at 15 mm, L at 30 mm, T at 3 mm, and the taper of the tapered surface 25 was 1/25.

TABLE 2

| | EX-AM-PLES | Conventional example | Note |
|---|---|---|---|
| Lateral bending strength | 564 kgf | 439 kgf | The greater value is better. |
| Force required for drawing out the stand striken in the direction shown by an arrow in FIG. 4 by means of a hammer | 255 kgf | 230 kgf | The greater value is better. |
| Length of the stand withdrawn when a load of 1.0 ton was applied in the same direction as in the above described item | 2.22 mm | 2.87 mm | The smaller value is better. |
| Length of the stand withdrawn when a load of 2.5 tons was applied in the same direction as in the above described item | 5.64 mm | The stand is disconnected to make the measurement impossible. | The smaller value is better. |
| Force required for drawing out the stand striken in the same direction as in the above described item by a load of 1.0 ton | 664 kgf | 452 kgf | The greater value is better. |

As is obvious from the above described results, the present invention can not exhibit the effects thereof until the formed semicircular slits are filled with the fillers containing the synthetic resins and the sealing agents to integrate the semicircular slits with the substrate. In addition, it can be found that the rotary substrate according to the present invention exhibits a sufficient sound damping effect in comparison with the conventional rotary substrate in which the grooves extending toward the center are filled with the synthetic resins.

In addition, the rotary blade, in which the rotary substrate according to the present invention is used, the blade being fixedly mounted with stand portion formed on the circumference of the substrate, and the grooves between the blades being filled with the fillers, exhibits a sufficient sound damping effect in the above described manner and can improve the working environment where this kind of rotary blade is used.

Furthermore, the cassette construction of the blade is achieved by the side surface engagement, in which the concave insides of the cassette stands having a section intertwined, so that the construction is more stable in comparison with the conventional up and down engagement by means of the dovetail grooves, and can be easily produced with higher dimensional accuracy, thereby being capable of easy, stable use in the installation and detachment thereof.

With respect to the construction, not only is it easier in machining in comparison with the dovetail grooves, but it can also be produced by powder metallurgy using a press mold and casting using a casting mold, so that the cost of production can be reduced.

What is claimed is:

1. A rotary blade, comprising:
   a rotary substrate having an outer edge, said rotary substrate having a plurality of first-semicircular slits therein opening toward the center of rotation of said rotary substrate and annularly distributed on said rotary substrate on a first circle about said center of rotation, and said rotary substrate having a plurality of second semicircular slits therein opening in a direction opposite to the opening direction of said plurality of first semicircular slits and annularly distributed on said rotary substrate on a second circle about said center of rotation inside of said plurality of first slits such that said second slits at least partially interrupt radii extending from said center of rotation to said plurality of first semicircular slits;
   filler materials disposed in said plurality of first semicircular slits and said plurality of second semicircular slits; and
   a plurality of chips disposed at intervals on said outer edge of said rotary substrate, each said chip being integrally formed of diamond particles and a metallic bond material.

2. The rotary blade as set forth in claim 1, wherein:
   a plurality of grooves are in said outer edge of said rotary substrate, said grooves defining stands therebetween; and
   said plurality of chips are fixed to respective said stands.

3. The rotary blades as set forth in claim 2, wherein said grooves are filled with filler materials.

4. The rotary blade as set forth in claim 1, wherein:
   each said chip has a cassette stand attached thereto, said cassette stand having a concave profile;
   said outer edge of said rotary substrate has a plurality of cassette stands thereon for receiving a respective said cassette stand attached to a said chip, said cassette stands on said outer edge having concave profiles, the concavity of which faces in the direction of a side of said rotary substrate, such that said cassette stands of said chips can engage with said cassette stands on said outer edge to fix said chips thereto.

5. The rotary blade as set forth in claim 1, wherein: there are two of said first lists for each said second slit.

6. The rotary blade as set forth in claim 1, wherein: each said second slit interrupts radii extending from said center of rotation to end points of adjacent said first slits.

7. A rotary substrate for use in a rotary blade, having a center of rotation, an outer edge, a plurality of first semicircular slits therein opening toward said center of rotation annularly distributed on said rotary substrate on a first circle about said center of rotation, and a plurality of second semicircular slits therein opening in a direction opposite to the opening direction of said plurality of first semicircular slits and annularly distributed on said rotary substrate on a second circle about said center of rotation inside of said plurality of first slits such that said second slits at least partially interrupt radii extending from said center of rotation to said plurality of first semicircular slits.

8. The rotary substrate as set forth in claim 7, wherein a plurality of grooves are in said outer edge.

9. The rotary substrate as set forth in claim 7, wherein there are two of said first slits for each said second slit.

10. The rotary substrate as set forth in claim 7, wherein each said second slit interrupts radii extending from said center of rotation to end points of adjacent said first slits.

* * * * *